(12) United States Patent
Shin et al.

(10) Patent No.: US 8,659,710 B2
(45) Date of Patent: Feb. 25, 2014

(54) LIQUID CRYSTAL DISPLAY DEVICE AND METHOD OF FABRICATING THE SAME

(75) Inventors: Hee-Sun Shin, Seoul (KR); Seok-Woo Lee, Bucheon-si (KR); Kwang-Sik Hwang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 804 days.

(21) Appl. No.: 12/904,826

(22) Filed: Oct. 14, 2010

(65) Prior Publication Data

US 2011/0157039 A1   Jun. 30, 2011

(30) Foreign Application Priority Data

Dec. 28, 2009 (KR) .................. 10-2009-0131858

(51) Int. Cl.
*G02F 1/1335* (2006.01)
*G06F 3/041* (2006.01)
*G06F 3/045* (2006.01)

(52) U.S. Cl.
USPC .............................. 349/12; 345/173; 345/174

(58) Field of Classification Search
USPC ...................... 349/12; 345/173, 174
See application file for complete search history.

(56) References Cited

U.S. PATENT DOCUMENTS

| | | | |
|---|---|---|---|
| 2009/0256816 A1* | 10/2009 | Kim ............................... | 345/174 |
| 2010/0053532 A1* | 3/2010 | Lai ................. | 349/151 |
| 2010/0194695 A1* | 8/2010 | Hotelling et al. ............. | 345/173 |
| 2011/0050642 A1* | 3/2011 | Lee et al. ...................... | 345/175 |

* cited by examiner

*Primary Examiner* — Bumsuk Won
*Assistant Examiner* — Ryan Crockett
(74) *Attorney, Agent, or Firm* — Brinks, Gilson & Lione (57) ABSTRACT

A liquid crystal display device includes: a first auxiliary line connected to the blocking pattern and below a gate line; a second auxiliary line in each touch block, and located at the same layer as, the first auxiliary line being made of the same material as the gate line; a first connection pattern contacting the first and second auxiliary lines; a common electrode in each touch block; x and y sensing lines on the common line and overlapping the gate and data lines, respectively; a pixel electrode in each pixel region, connected to a drain electrode through a drain contact hole, and including a plurality of openings; and a second connection pattern contacting the first connection pattern and the x sensing line through first and second contact holes, respectively.

20 Claims, 5 Drawing Sheets

LIQUID CRYSTAL DISPLAY DEVICE AND METHOD OF FABRICATING THE SAME

This application claims the benefit of Korea Patent Application No. 10-2009-0131858, filed on Dec. 28, 2009, the entire contents of which is incorporated herein by reference for all purposes as if fully set forth herein.

BACKGROUND

1. Field of the Invention

The present disclosure relates to a liquid crystal display device, and more particularly, to a liquid crystal display device and a method of fabricating the same.

2. Discussion of the Related Art

Until recently, display devices have typically used cathode-ray tubes (CRTs). Presently, many efforts and studies are being made to develop various types of flat panel displays, such as liquid crystal display (LCD) devices, plasma display panels (PDPs), field emission displays, and electro-luminescence displays (ELDs), as a substitute for CRTs. Of these flat panel displays, LCD devices have many advantages, such as high resolution, light weight, thin profile, compact size, and low voltage power supply requirements.

In general, an LCD device includes two substrates that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes in accordance with the intensity of the induced electric field into the direction of the induced electric field, thereby changing the light transmissivity of the LCD device. Thus, the LCD device displays images by varying the intensity of the induced electric field.

Figure 1:
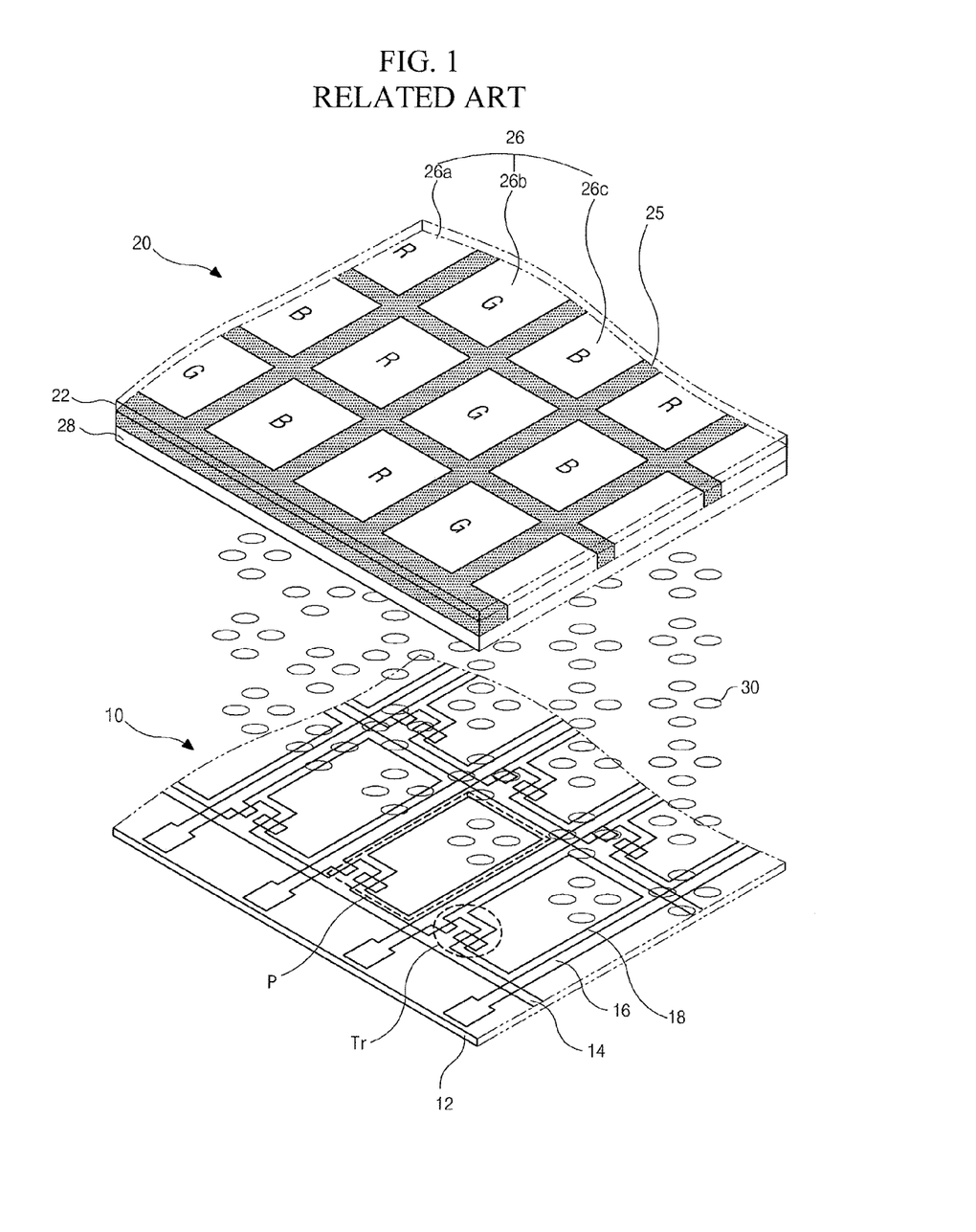
FIG. 1 is a perspective view illustrating an LCD device according to the related art.

FIG. 1 is a perspective view illustrating an LCD device according to the related art.

Referring to FIG. 1, the LCD device includes an array substrate 10, a color filter substrate 20 and a liquid crystal layer 30 between the array substrate 10 and the color filter substrate 20.

The array substrate 10 includes gate and data lines 14 and 16 crossing each other on a first substrate 12 to define a pixel region P. A thin film transistor Tr is formed at a crossing portion of the gate and data lines 14 and 16. A pixel electrode 18 in the pixel region P is connected to the thin film transistor Tr.

The color filter substrate 20 includes a black matrix 25 on a second substrate 22 and corresponding to the gate and data lines 14 and 16 and the thin film transistor Tr. A color filter layer 26 corresponds to the pixel region P. The color filter layer includes red (R), green (G) and blue (B) color filter patterns 26a, 26b and 26c corresponding to the respective pixel regions P. A common electrode 28 is formed on the black matrix 25 and the color filter layer 26.

Although not shown in the drawings, a sealant is formed along peripheral portions of the array substrate 10 and the color filter substrate 20 to attach the array substrate 10 and the color filter substrate 20. Alignment layers to align liquid crystal molecules of the liquid crystal layer 30 are formed at the array substrate 10 and the color filter substrates, respectively. Polarizing plates are formed on outer surfaces of the array substrate 10 and the color filter substrate 20, respectively. A backlight unit is below the array substrate 10 to supply light.

When a gate signal is supplied to the gate line 14, the thin film transistor Tr is turned on and a data signal is supplied through the data line 16 to the pixel electrode 18. Accordingly, an electric field is induced between the pixel electrode 16 and the common electrode 28, and images are displayed through the LCD device.

Recently, the LCD device is employed in various electronic devices such as a television (TV), a projector, a mobile station, a person digital assistant (PDA) and the like, and these devices performs specific operations through user's touch on a display screen.

To realize the touch function, it is required that the LCD device further includes additional elements such as touch blocks sensing touch and sensing lines connected to the touch blocks. The sensing lines of low resistance metal are formed at a layer different from the layers where the gate and data lines are formed. Since the sensing lines should transfer information of position, where touch sensed by a touch sensor occurs, to x and y sensing circuits, which are located at a non-display region of the LCD device, the sensing lines in x and y directions are formed. In this case, since the sensing lines in the x and y directions are all formed at the same layer, the x sensing line in the x direction and the y sensing line in the y direction would necessarily cross and be short-circuited therebetween. This short-circuit between the x sensing line and the y sensing line should be prevented. Particularly, the short-circuit, in the touch block, between the x sensing line and the y sensing line should be prevented. To do this, an auxiliary line is used as a detour path for the x sensing line. In other words, the auxiliary line is formed at the same layer and of the same material as the gate line and is connected to the x sensing line, and the short-circuit between the x and y sensing lines is thus prevented.

The touch block senses little change of capacitance that occurs when a user touches a display screen using a user's finger, converts the change of capacitance into a signal such as a current, and transfers the signal to the x and y sensing circuits through the respective sensing lines. Accordingly, minute currents flow on the sensing lines. For the currents to reach the x and y sensing circuits through the sensing lines, the sensing lines should have low resistance per unit area.

The auxiliary line used as a portion of the sensing line should also have low resistance, and to do this, the auxiliary line should increase in width or thickness. However, in the case of the width increase of the auxiliary line, reduction of aperture ratio of the LCD device is caused. Further, in the case of the thickness increase of the auxiliary line, thickness increase of the gate line, which is formed at the same process of forming the auxiliary line, is caused, and, in an etching process to form the auxiliary line and the gate line, difference of etching ratio between a center portion and a peripheral portion of the array substrate occurs and thus non-uniformity of gate line pattern is caused.

BRIEF SUMMARY

A liquid crystal display device includes: a substrate including a display region to display images, the display region including a plurality of touch blocks, the touch block including a plurality of pixel regions; gate and data lines crossing each other on the substrate to define the pixel region; a thin film transistor in the pixel region and connected to the gate and data lines; a blocking pattern below the thin film transistor with a first insulating layer therebetween; a first auxiliary line connected to the blocking pattern and below the gate line with the first insulating layer therebetween; a second auxiliary line in each touch block, the second auxiliary line being located at the same layer as, made of the same material as, and in parallel with the gate line; a first connection pattern contacting the first and second auxiliary lines; a first passivation layer on the thin film transistor and the first connection pattern; a common electrode in each touch block and on the first passivation layer; x and y sensing lines on the common line and overlapping the gate and data lines, respectively; a second passivation layer on the x and y sensing lines, and including a drain contact hole to expose a drain electrode of the thin film transistor, a first contact hole to expose the first connection pattern, and a second contact hole to expose the x sensing line; a pixel electrode in each pixel region, connected to the drain electrode through the drain contact hole, and including a plurality of openings; and a second connection pattern spaced apart from the pixel electrode, and contacting the first connection pattern and the x sensing line through the first and second contact holes, respectively.

In another aspect, a method of fabricating a liquid crystal display device includes: forming a first auxiliary line and a blocking pattern on a substrate that includes a display region to display images, wherein the display region includes a plurality of touch blocks, wherein the touch block includes a plurality of pixel regions, and wherein the blocking pattern is formed in each pixel region; forming a first insulating layer on the first auxiliary line and the blocking pattern; forming a gate line and a second auxiliary line on the first insulating layer, wherein the gate line overlaps the first auxiliary line, and wherein the second auxiliary line is formed in each touch block and spaced apart from the gate line; forming an insulating interlayer on the gate line and the second auxiliary line; forming a data line and a first connection pattern on the insulating interlayer, wherein the data line crosses the gate line to define the pixel region, wherein the first connection pattern contacts the first and second auxiliary lines; forming a thin film transistor in the pixel region and connected to the gate and data lines; forming a first passivation layer on the thin film transistor and the first connection pattern; forming a common electrode in each touch block and on the first passivation layer; forming x and y sensing lines on the common line and overlapping the gate and data lines, respectively; forming a second passivation layer on the x and y sensing lines, wherein the second passivation layer includes a drain contact hole to expose a drain electrode of the thin film transistor, a first contact hole to expose the first connection pattern, and a second contact hole to expose the x sensing line; and forming a pixel electrode in the pixel region and a second connection pattern on the second passivation layer, wherein the pixel electrode is connected to the drain electrode through the drain contact hole, and includes a plurality of openings, and wherein the second connection pattern is spaced apart from the pixel electrode and contacts the first connection pattern and the x sensing line through the first and second contact holes, respectively.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

In the drawings.

DETAILED DESCRIPTION OF THE DRAWINGS AND THE PRESENTLY PREFERRED EMBODIMENTS

Reference will now be made in detail to the illustrated embodiments of the present disclosure, which are illustrated in the accompanying drawings.

Figure 2:
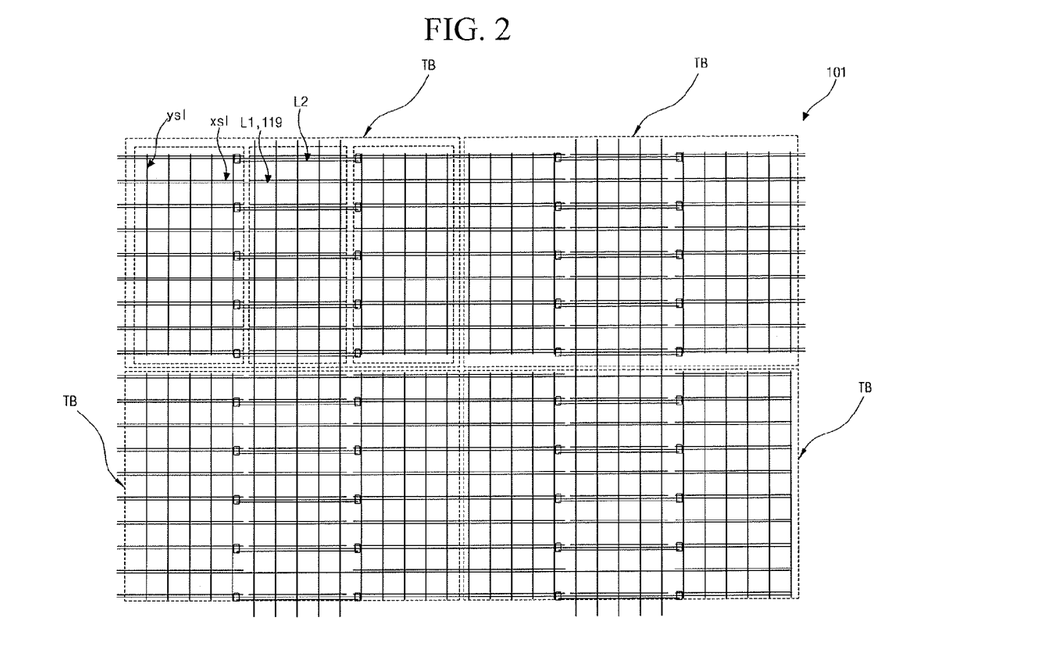
FIG. 2 is a plan view illustrating a portion of a display region of an array substrate for an LCD device according to an embodiment of the present disclosure.
Figure 3:
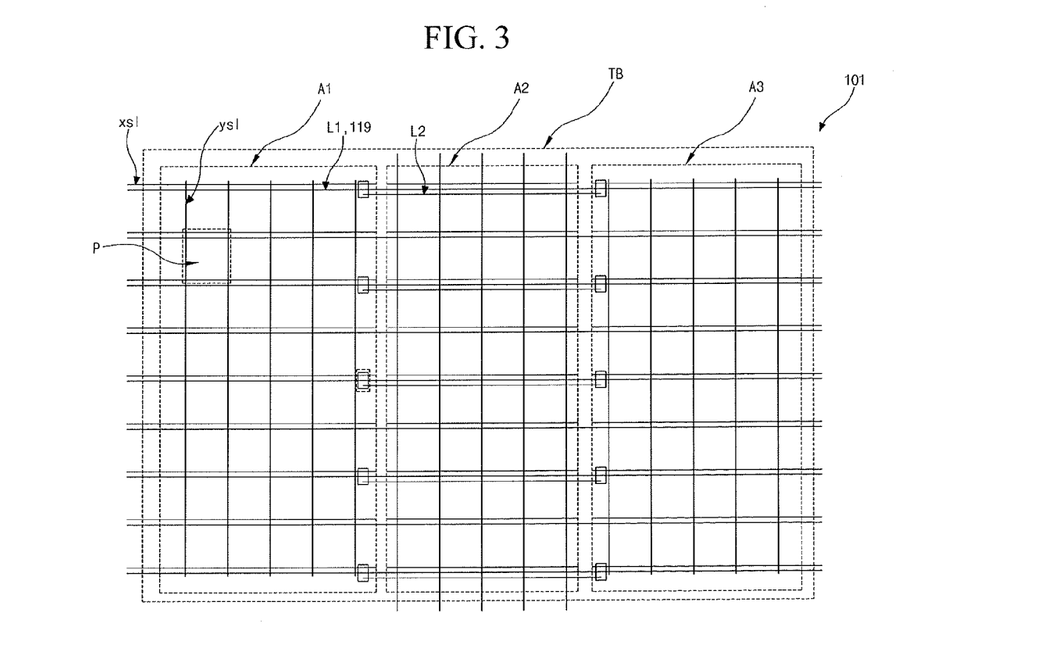
FIG. 3 is a plan view illustrating a touch block of the array substrate for the LCD device according to the embodiment of the present disclosure.
Figure 4:
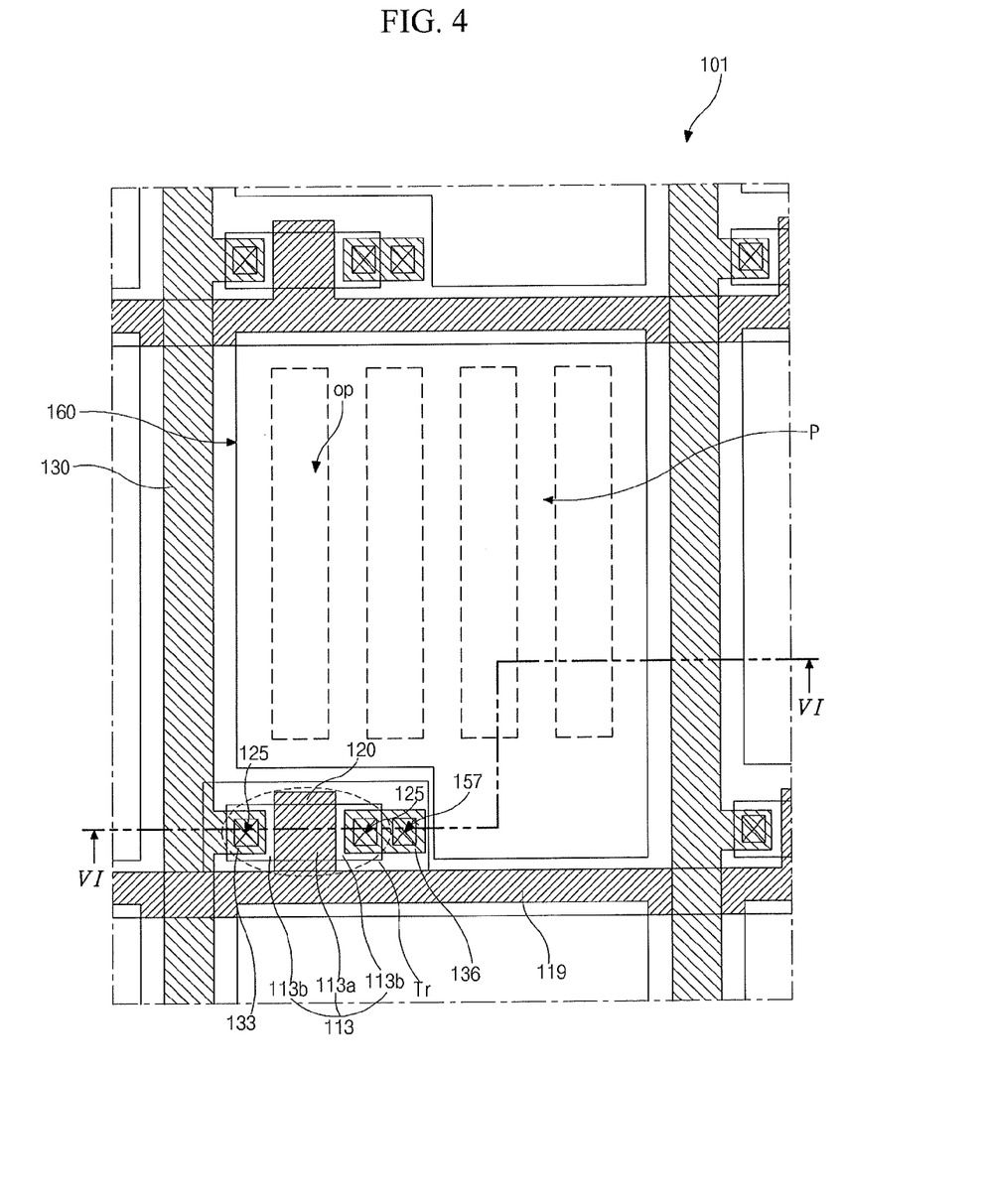
FIG. 4 is a plan view illustrating a pixel region in the array substrate for the LCD device according to the embodiment of the present disclosure.
Figure 5:
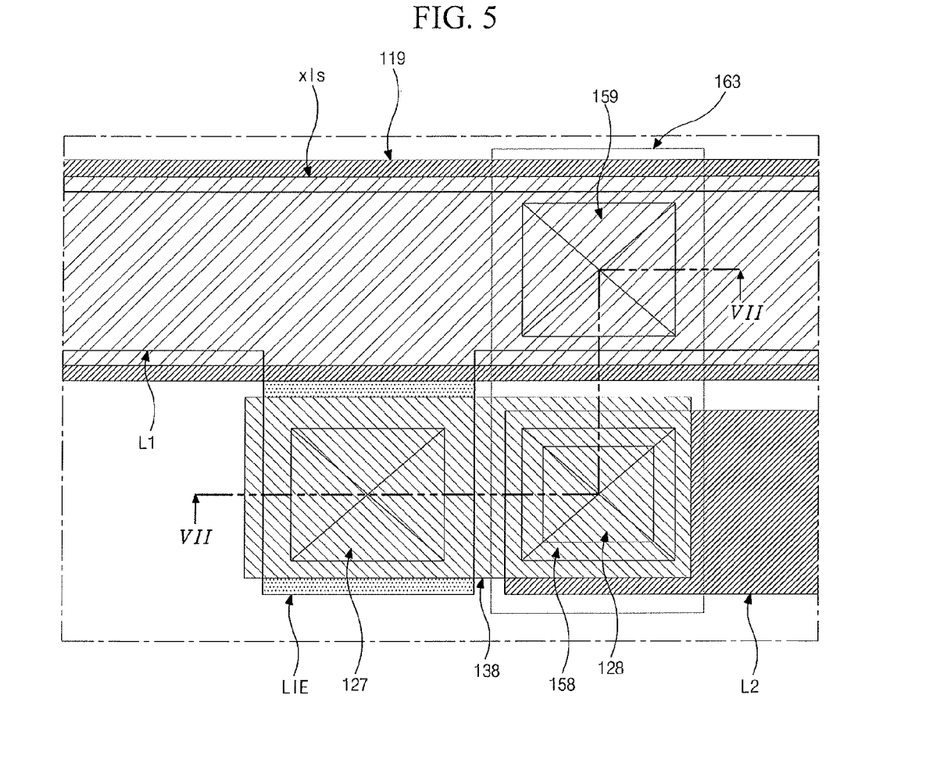
FIG. 5 is a plan view illustrating connection among a x sensing line and first and second auxiliary lines in the array substrate for the LCD device according to the embodiment of the present disclosure. The LCD device of the embodiment may be referred to as a touch sensor in-cell type LCD device.

FIG. 2 is a plan view illustrating a portion of a display region of an array substrate for an LCD device according to an embodiment of the present disclosure, FIG. 3 is a plan view illustrating a touch block of the array substrate for the LCD device according to the embodiment of the present disclosure, FIG. 4 is a plan view illustrating a pixel region in the array substrate for the LCD device according to the embodiment of the present disclosure, and FIG. 5 is a plan view illustrating connection among a x sensing line and first and second auxiliary lines in the array substrate for the LCD device according to the embodiment of the present disclosure. The LCD device of the embodiment may be referred to as a touch sensor in-cell type LCD device.

Referring to FIGS. 2 to 5, the array substrate includes a gate in a first direction 119, for example, an x direction, and a data line 130 in a second direction, for example, a y direction. The gate and data lines 119 and 130 cross each other to define a pixel region P.

In the pixel region P, a thin film transistor Tr connected to the gate and data lines 119 and 130 is formed. A blocking pattern 103 is formed below the thin film transistor Tr and functions to block light, which is emitted from a backlight unit (not shown), from being incident on a semiconductor layer 113 of the thin film transistor Tr.

Sensing lines xsl and ysl overlap the gate and data lines 119 and 130. In more detail, a x sensing line xsl extends in the x direction and overlaps the gate line 119, and a y sensing line extends in the y direction and overlaps the data line 130.

In the pixel region P, a pixel electrode 160 is formed and includes a plurality of openings op that may have a bar shape.

A touch block TB may be defined as a touch sensor unit that corresponds to the plurality of pixel regions P. A display region as an effective region to display images includes a plurality of touch blocks TB. A non-display region surrounds the display region.

Each touch block TB may be divided into three regions A1 to A3. For example, the first to third regions A1 to A3 may be sequentially located along an extension direction of the gate line 119 (i.e., the x direction).

The second region A2 of each touch block TB may be connected to neighboring touch blocks TB along the y direction through the y sensing line ysl. In other words, the second region A2 of the touch block TB may be connected to second regions A2 of neighboring touch blocks TB along the y direction.

The first region A1 of each touch block TB may be connected to a neighboring touch block TB, which are located on the left, through the x sensing line xsl, and the third region A3 of each touch block TB may be connected to a neighboring touch block TB, which are located on the right, through the x sensing line xsl. In other words, the first region A1 of the touch block TB may be connected to a third region A3 of a neighboring touch block TB, and the third region A3 of the touch block TB may be connected to a first region of a neighboring touch block TB.

In each touch block TB, the x sensing line xsl may be separated at a boundary portion between the first and second regions A1 and A2 and a boundary portion between the second and third regions A2 and A3.

Even though the x sensing line xsl is disconnected, the x sensing line xsl is electrically connected in each touch block TB.

In more detail, parts of the x sensing line xsl corresponding to the first and third regions A1 and A3 are connected to each other through a second auxiliary line L2. The second auxiliary line L2 may be formed at the same layer and of the same material as the gate line 119, and be in parallel with the gate line 119. The second auxiliary line L2 may be formed in each touch block TB. For example, the second auxiliary line L2 crosses the second region A2 and extends into the first and third regions A1 and A3. The second auxiliary line L2 may be connected to one ends of the parts of the x sensing line xsl located at the first and third regions A1 and A3 through contact holes that are formed in at least one insulating layer between the second auxiliary line L2 and the x sensing line xsl. Through the above configuration, the x sensing line xsl can be prevented from short-circuiting the y sensing line ysl in the second region A2.

Further, the second auxiliary line L2 may be connected to a first auxiliary line L1. The first auxiliary line L1 may extend from the blocking pattern 103 and overlap the gate line 119 along the extension direction of the gate line 119 over the display region. The first auxiliary line L1 may be connected to the second auxiliary line L2 through contact holes that are formed in at least one insulating layer between the first and second auxiliary lines L1 and L2.

For example, the first and second contact holes 127 and 128 expose the first and second auxiliary lines L1 and L2, respectively, in each of the first and third regions A1 and A3, and a first connection pattern 138 contacts the first and second auxiliary lines L1 and L2 through the first and second contact holes 127 and 128, respectively. Accordingly, the first and second auxiliary lines L1 and L2 are connected. The first connection pattern 138 may be formed at the same layer and of the same material as the data line 130.

Since the first and second auxiliary lines L1 and L2 are electrically connected, the first auxiliary line L1 functions as another auxiliary line extending from the second auxiliary line L2. In other words, the first and second auxiliary lines L1 and L2 functions as a double-layered auxiliary line. This configuration effects increase of a cross-sectional area which charges flow though, and the configuration thus effects reduction of resistance per unit area. Accordingly, the configuration has the effect like a configuration when forming the second auxiliary line L2 more thickly. Therefore, even though electrical connection of the x sensing line xsl is made by connecting the second auxiliary line L2 to the x sensing line xsl at both of the boundary portion between the first and second regions A1 and A2 and the boundary portion between the second and third regions A2 and A3, because of employing the first auxiliary line L1, a signal line transferring a sensing signal of the embodiment can have the resistance less than the related art.

The y sensing line ysl may be separated between the first regions A1 of neighboring touch blocks TB along the y direction and between the third regions A3 of neighboring touch blocks TB along the y direction.

Although not shown in the drawings, x and y sensing circuits may be located in the non-display region, or outside the array substrate. The x sensing circuit is connected to an end of the x sensing line xsl, and the y sensing circuit is connected to an end of the y sensing line ysl. Change of capacitance, which is induced by the pixel electrode 165 and a common electrode overlapping each other with a third passivation layer (not shown) therebetween when one among all touch blocks TB is touched, is transferred through the x and y sensing lines xsl and ysl into the x and y sensing circuits. Through this, the touch position can be recognized.

Figure 6:
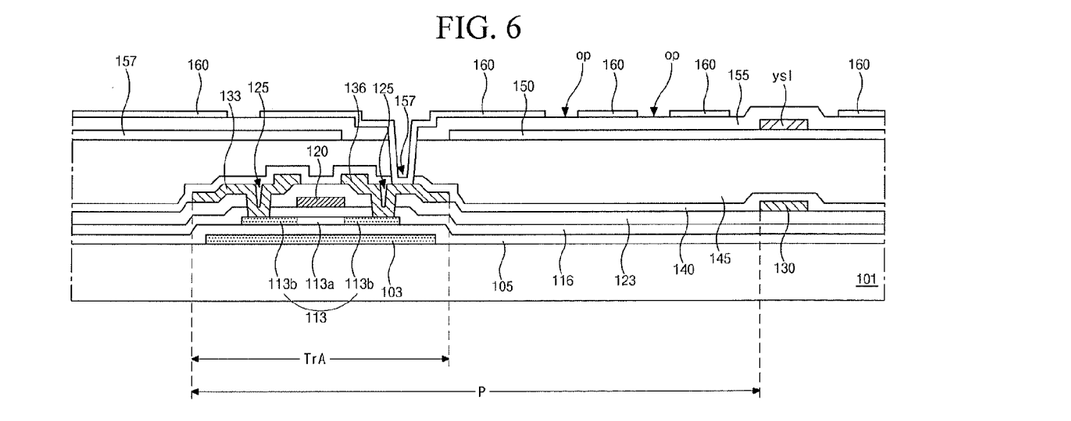
FIG. 6 is a cross-sectional view taken along a line VI-VI of FIG. 4.
Figure 7:
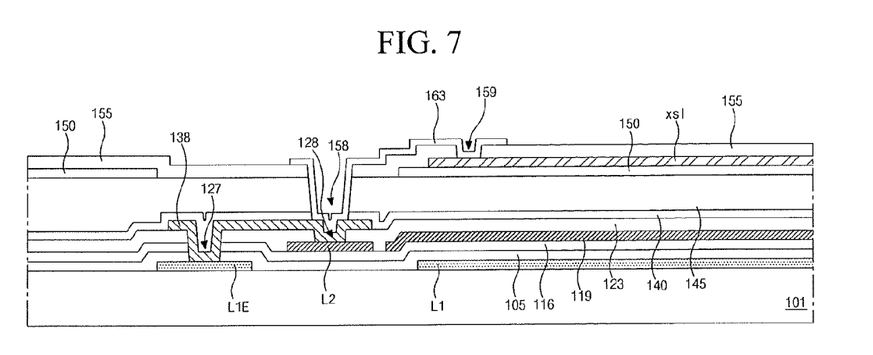
FIG. 7 is a cross-sectional view taken along a line VII-VII of FIG. 5.

A structure of the LCD device of the embodiment is explained in more detail further with reference to FIGS. 6 and 7.

FIG. 6 is a cross-sectional view taken along a line VI-VI of FIG. 4, and FIG. 7 is a cross-sectional view taken along a line VII-VII of FIG. 5. In FIGS. 6 and 7, a switching region TrA, where the thin film transistor Tr is formed, is defined in the pixel region P.

Referring to FIGS. 6 and 7, the blocking pattern 103 is formed on a substrate 101. The blocking pattern 103 may be made of a metal material having relatively high melting temperature, for example, molybdenum (Mo). The first auxiliary line L1 is formed at the same layer and of the same material as the blocking pattern 103. The first auxiliary line L1 is configured such that the first auxiliary line L1 overlaps the gate line 119 along the extension direction of the gate line 119. An extension portion L1E protrudes from the first auxiliary line into the pixel region P to correspond to the first contact hole 127. Through the extension portion L1E, the first auxiliary line L1 is connected to the second auxiliary line L2. In more detail words, the first contact hole 127 is formed outside a region, where the gate line 119 is formed, and exposes the extension portion L1E, and, through the extension portion L1E and the first and second contact holes 127 and 128, the first and second auxiliary lines L1 and L2 are connected.

A first insulating layer 105 is formed on the substrate 101 having the first auxiliary line L1 and the blocking pattern 103. The first insulating layer 105 may be made of an inorganic insulating material that includes, but not limited to, silicon oxide ($SiO_2$) and silicon nitride (SiNx).

A semiconductor layer 113 is formed on the first insulating layer 105 in the switching region TrA. The semiconductor layer 113 may be made of polycrystalline silicon. The semiconductor layer 113 includes a first semiconductor regions 113*a* and second semiconductor region 113*bs* at both sides of the first semiconductor regions 113*a*. The first semiconductor region 113*a* may be made of intrinsic polycrystalline silicon and function as a channel of the semiconductor layer 113*a*. The second semiconductor region 113*b* may be made of extrinsic polycrystalline silicon that may be doped with n+ or p+ ions.

A gate insulating layer 116 is formed on the substrate 101 having the semiconductor layer 113.

A gate electrode 120 is formed on the gate insulating layer 116 corresponding to the first semiconductor region 113*a*.

Further, the gate line 119 connected to the gate electrode 120 is formed on the gate insulating layer 116 and extends along the x direction. The gate line 119 overlaps the first auxiliary line L1.

The second auxiliary line L2 is formed on the gate insulating layer 116 in each touch block TB. The second auxiliary line L2 is spaced apart from and in parallel with the gate line 119. The second auxiliary line L2 is spaced apart from the extension portion L1E of the first auxiliary line L1.

An insulating interlayer 123 is formed on the substrate 101 having the gate electrode 120, the gate line 119 and the second auxiliary line L2. The insulating interlayer 123 may be made of an inorganic insulating material that includes, but not limited to, silicon oxide ($SiO_2$) and silicon nitride (SiNx).

The insulating interlayer 123 and the gate insulating layer 116 include semiconductor contact holes 125 exposing the second semiconductor regions 113b. The insulating interlayer 123, the gate insulating layer 116 and the first insulating layer 105 include the first contact hole 127 exposing the extension portion L1E. The insulating interlayer 123 includes the second contact hole 128 exposing each of both end portions of the second auxiliary line L2.

The data line 130 and the source and drain electrodes 133 and 136 are formed on the insulating interlayer 123. The source electrode 133 is connected to the data line 130 and spaced apart from the drain electrode 136.

The semiconductor layer 113, the gate insulating layer 116, the gate electrode 120, the insulating interlayer 123 and the source and drain electrodes 133 and 136 in the switching region TrA form the thin film transistor Tr.

The first connection pattern 138 is formed on the insulating interlayer 123. The first connection pattern 138 contacts the extension portion L1E through the first contact hole 127, and the second auxiliary line L2 through the second contact hole 128. Accordingly, the first and second auxiliary lines L1 and L2 are electrically connected.

A first passivation layer 140 is formed on the substrate 101 having the first connection pattern 138. The first passivation layer 140 may be made of an inorganic insulating material that includes, but not limited to, silicon oxide ($SiO_2$) and silicon nitride (SiNx).

A second passivation layer 145 is formed on the first passivation layer 140. The second passivation layer 145 may be made of an organic insulating material that includes, but not limited to, benzocyclobutene (BCB) and photo acrylic. The second passivation layer 145 may have a thickness of about 2 μm to about 4 μm so that the substrate 101 having the second passivation layer 145 has a substantially even surface.

The first passivation layer 140 can function to improve adhesion property between the metal material such as the data line 130, the source and drain electrodes 133 and 136 and the first connection pattern 138, and the organic insulating material such as the second passivation layer 145. In other words, since the metal material adheres onto the inorganic insulating material better than the organic insulating material, the first passivation layer 140 is formed between the second passivation layer 145, and the data line 130, the source and drain electrodes 133 and 136 and the first connection pattern 138. However, it should be understood that the first passivation layer 140 may be omitted.

The common electrode 150 is formed on the second passivation layer 145 in each touch block TB. In other words, the common electrodes 150 of neighboring touch blocks TB are separated from each other. Further, the common electrode 150 may be formed in each of the first to third regions A1 to A3 of each touch block TB. In other words, the common electrodes 150 of the first to third regions A1 to A3 are separated from one another. The common electrode 150 may be made of a transparent conductive material that includes, but not limited to, indium-tin-oxide (ITO), indium-zinc-oxide (IZO) and indium-tin-zinc-oxide (ITZO).

The x and y sensing lines xsl and ysl are formed on the common electrode 150. In each of the first to third regions A1 to A3, the x and y sensing lines cross and are connected to each other. However, the first and third regions A1 and A3 are electrically connected, the second region A2 is electrically separated from the first and third regions A1 and A3, and the second regions A2 of neighboring touch blocks TB along the y direction are electrically connected. Accordingly, short-circuit between the x and y sensing lines xsl and ysl in each of the first to third regions A1 to A3 is not problematic.

A third passivation layer 155 is formed on the substrate 101 having the x and y sensing lines xsl and ysl. The third passivation layer 155 may be made of an inorganic insulating material that includes, but not limited to, silicon oxide ($SiO_2$) and silicon nitride (SiNx).

The first to third passivation layers 140, 145 and 155 include a drain contact hole 157 exposing the drain electrode 136 and a third contact hole 158 exposing the first connection pattern 138. The third contact hole 158 may correspond to the second contact hole 128. The third passivation layer 155 includes a fourth contact hole 159 exposing the x sensing line xsl in the first and third regions A1 and A3.

The pixel electrode 160 is formed in each pixel region P and contacts the drain electrode 136 through the drain contact hole 157. The pixel electrode 160 includes the openings op to induce a fringe electric field between the pixel electrode 160 and the common electrode 150. The pixel electrode 160 may be made of a transparent conductive material that includes, but not limited to, indium-tin-oxide (ITO), indium-zinc-oxide (IZO), and indium-tin-zinc-oxide (ITZO).

The second connection pattern 163 is formed on the third passivation layer 155. The second connection pattern 163 is formed at the same layer and of the same material as the pixel electrode 160. The second connection pattern 163 contacts the first connection pattern 138 through the third contact hole 158, and contacts the x sensing line xsl through the fourth contact hole 159.

Portions of the pixel electrode 160 and the common electrode 150 overlapping each other with the third passivation layer 155 therebetween form a storage capacitor.

A method of fabricating the LCD device of the embodiment is explained with reference to FIGS. 3 to 7 as follows.

A first metal layer is formed on the substrate 101 and patterned in a mask process to form the blocking pattern 103 and the first auxiliary line L1. The first metal may be a metal having a property of well blocking light and relatively high melting temperature, for example, molybdenum (Mo). The mask process may include forming a photoresist layer on the first metal layer, exposing the photoresist layer to light using a photo mask, developing the photoresist layer, etching the first metal layer using the developed photoresist layer, stripping the photoresist layer and the like. The first auxiliary line L1 includes the extension portion L1E.

Then, the first insulating layer 105 is formed on the substrate 101 having the first auxiliary line L1 and the blocking pattern 103.

Then, an amorphous silicon layer is formed on the first insulating layer 105. A laser irradiation or thermal treatment is performed for the amorphous silicon layer to form a polycrystalline silicon layer. The polycrystalline silicon layer is patterned in a mask process to form the semiconductor layer 113 in the switching region TrA.

Then, the gate insulating layer 116 is formed on the substrate 101 having the semiconductor layer 113.

Then, a second metal layer is formed on the gate insulating layer 116 and patterned to form the gate electrode 120, the gate line 119 and the second auxiliary line L2. The second metal may include, but not limited to, aluminum (Al), aluminum alloy (e.g., AlNd), copper (Cu), copper alloy, chromium (Cr).

Then, an ion doping process is performed for the semiconductor layer 113 using the gate electrode 120 as an ion blocking mask. Through the ion doping process, the second regions 113b doped with ions are formed, and the first region 113a is blocked from being doped with ions. Accordingly, the first region 113a is made of the intrinsic polycrystalline silicon, and the second region 113b is made of the extrinsic polycrystalline silicon.

Then, the insulating interlayer 123 is formed on the substrate 101 having the gate electrode 120, the gate line 119 and the second auxiliary line L2.

Then, the insulating interlayer 123, the gate insulating layer 116 and the first insulating layer 105 are patterned to form the semiconductor contact holes 125 exposing the second semiconductor regions 113b, the first contact hole 127 exposing the extension portion L1E, and the second contact hole 128 exposing the second auxiliary line L2.

Then, a third metal layer is formed on the insulating interlayer 123 and patterned to form the source and drain electrodes 133 and 136, the data line 130, and the first connection pattern 138. The third metal may include, but not limited to, aluminum (Al), aluminum alloy (e.g., AlNd), copper (Cu), copper alloy, chromium (Cr) and molybdenum (Mo).

Then, the first and second passivation layers 140 and 145 are sequentially formed on the substrate 101 having the source and drain electrodes 133 and 136, the data line 130, and the first connection pattern 138.

Then, a transparent conductive material layer is formed on the second passivation layer 145 and patterned to form the common electrode 150. The common electrode 150 may have holes corresponding to the drain contact hole 157 and the third contact hole 158 that are formed later, and the holes of the common electrode 150 may have areas in plane more than the corresponding drain contact hole and third contact hole 157 and 158. This configuration can prevent the common electrode 150 from short-circuiting the drain electrode 136 and the pixel electrode 160 through the drain contact hole 157, and prevent the common electrode 150 from short-circuiting the first and second connection patterns 138 and 163 through the third contact hole 158.

Then, a fourth metal layer is formed on the substrate 101 having the common electrode 150 and patterned to form the x and y sensing lines xsl and ysl.

Then, the third passivation layer 155 is formed on the substrate 101 having the x and y sensing lines xsl and ysl.

The first to third passivation layers 140, 145 and 155 are patterned to form the drain contact hole 157 exposing the drain electrode 136, the third contact hole 158 exposing the first connection pattern 138, and the fourth contact hole 159 exposing the x sensing line xsl in the first and third regions A1 and A3.

Then, a transparent conductive material layer is formed on the third passivation layer 155 and patterned to form the pixel electrode 160, and the second connection pattern 163.

Through the above-described processes, the array substrate for the LCD device of the embodiment can be fabricated.

The array substrate is coupled with an opposing substrate, for example, a color filter substrate with a liquid crystal layer therebetween. Further, a process of connecting the x sensing circuit to the x sensing lines xsl and connecting the y sensing circuit to the y sensing lines ysl may be performed. Accordingly, the LCD device of the embodiment can be fabricated.

When a user touch a screen of the LCD device, change of capacitance between the common electrode 150 and the pixel electrode 160 occurs, and the change of capacitance is converted into signals in type of voltage or current and transferred through the x and y sensing lines xsl and ysl to the x and y sensing circuits. Accordingly, the touch position is recognized, and operation relevant to the touch is performed.

In the above-described embodiment, the electrical connection of the x sensing line is through the second auxiliary line, and the second auxiliary line is connected to the first auxiliary line. The first and second auxiliary lines L1 and L2 functions as a double-layered auxiliary line. This configuration effects increase of a cross-sectional area which charges flow though, and the configuration thus effects reduction of resistance per unit area. Accordingly, a signal line transferring a sensing signal can have the resistance less than the related art.

Further, since the second auxiliary line, which is formed at the same layer as the gate line, is not needed to increase in thickness, the non-uniformity of gate line pattern due to increase of thickness in the related art can be prevented.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

The invention claimed is:

1. A liquid crystal display device, comprising:
  a substrate including a display region to display images, the display region including a plurality of touch blocks, each touch block including a plurality of pixel regions;
  gate and data lines crossing each other on the substrate to define the plurality of pixel regions;
  a thin film transistor in each pixel region connected to respective ones of the gate and data lines;
  a blocking pattern below each thin film transistor with a first insulating layer therebetween;
  a first auxiliary line in each touch block connected to blocking patterns and extending below one of the gate lines with the first insulating layer therebetween;
  a second auxiliary line in each touch block, each second auxiliary line being located at the same layer as, made of the same material as, and in parallel with the gate lines;
  a first connection pattern in each touch block contacting respective first and second auxiliary lines;
  a first passivation layer on the thin film transistor and the first connection pattern;
  a common electrode in each touch block and on the first passivation layer;
  x and y sensing lines on the common electrode in each touch block and overlapping the gate and data lines, respectively;
  a second passivation layer on the x and y sensing lines, and including a drain contact hole in each pixel region to expose a drain electrode of the respective thin film transistor, a first contact hole in each touch block to expose the respective first connection pattern, and a second contact hole in each touch block to expose the respective x sensing line;
  a pixel electrode in each pixel region, connected to the respective drain electrode through the respective drain contact hole, and including a plurality of openings; and a second connection pattern in each touch block spaced apart from the pixel electrodes, each second connection pattern connected to the respective first connection pattern and the respective x sensing line in each touch block through the first and second contact holes in each touch block, respectively.

2. The device according to claim 1, wherein each touch block includes a first and a third region that are connected to neighboring touch blocks along an extension direction of the gate lines through the respective x sensing line, and a second region that is connected to neighboring touch blocks along an extension direction of the data lines through the respective y sensing line, wherein the common electrode of each touch block is formed separately in each of the first to third regions.

3. The device according to claim 2, wherein each x sensing line in each touch block is separated between the respective first and second regions and between the respective second and third regions, wherein parts of each x sensing line corresponding to the respective first and third regions are connected through the respective second auxiliary line, and wherein one end of the parts of each x sensing line corresponding to the respective first and third regions is connected to the respective first connection pattern that connects the respective first and second auxiliary lines.

4. The device according to claim 3, wherein touch blocks along the extension direction of the gate lines are electrically connected through respective x sensing lines, and wherein touch blocks along the extension direction of the data lines are electrically connected through the respective y sensing lines.

5. The device according to claim 4, further comprising:
an x sensing circuit connected to one end of the x sensing lines; and
a y sensing circuit connected to one end of the y sensing lines.

6. The device according to claim 1, further comprising a third passivation layer between the first passivation layer and the thin film transistor that is made of an inorganic insulating material, wherein the first passivation layer is made of an inorganic insulating layer and has a substantially even surface.

7. The device according to claim 1, wherein the blocking patterns and the first auxiliary lines are made of molybdenum (Mo).

8. The device according to claim 1, wherein each first auxiliary line includes an extension portion protruding into a respective pixel region, and wherein the first insulating layer includes a third contact hole in each touch block, through which the respective extension portion contacts the respective first connection pattern.

9. The device according to claim 1, wherein each thin film transistor includes:
a semiconductor layer on the first insulating layer, the semiconductor layer including a first semiconductor region that is made of intrinsic polycrystalline silicon and second semiconductor regions that are made of extrinsic polycrystalline silicon, the second semiconductor regions being located at both sides, respectively, of the first region;
a gate insulating layer on the semiconductor layer;
a gate electrode on the gate insulating layer and corresponding to the first semiconductor region;
an insulating interlayer exposing the second semiconductor regions; and
a source electrode and the drain electrode contacting the second semiconductor regions, respectively.

10. The device according to claim 1, wherein the common electrode in each touch block includes holes corresponding to the respective drain contact hole and the respective first contact hole, and wherein the holes of the common electrodes have areas in plan view greater than the corresponding drain electrode and the corresponding first contact hole, respectively.

11. A method of fabricating a liquid crystal display device, the method comprising:
forming first auxiliary lines and blocking patterns on a substrate that includes a display region to display images, wherein the display region includes a plurality of touch blocks, wherein each touch block includes a plurality of pixel regions, and wherein a blocking pattern is formed in each pixel region and a first auxiliary line is formed in each touch block;
forming a first insulating layer on the first auxiliary lines and the blocking patterns;
forming gate lines and second auxiliary lines on the first insulating layer, wherein the gate lines overlap the first auxiliary lines in plan view, and wherein a second auxiliary line is formed in each touch block and spaced apart from a respective gate line;
forming an insulating interlayer on the gate lines and the second auxiliary lines;
forming data lines and a first connection pattern in each touch block, on the insulating interlayer, wherein the data lines cross the gate lines to define the pixel region, wherein each first connection pattern contacts respective first and second auxiliary lines;
forming a thin film transistor in each pixel region and connected to respective gate and data lines;
forming a first passivation layer on the thin film transistor and the first connection pattern;
forming a common electrode in each touch block and on the first passivation layer;
forming x and y sensing lines on the common electrode in each touch block and overlapping the gate and data lines, respectively;
forming a second passivation layer on the x and y sensing lines, wherein the second passivation layer includes a drain contact hole in each pixel region to expose a drain electrode of the respective thin film transistor, a first contact hole in each touch block to expose the respective first connection pattern, and a second contact hole in each touch block to expose the respective x sensing line; and
forming a pixel electrode in each pixel region and a second connection pattern in each touch block on the second passivation layer, wherein each pixel electrode is connected to the respective drain electrode through the respective drain contact hole, and includes a plurality of openings, and wherein each second connection pattern is spaced apart from the pixel electrodes and is connected to the respective first connection pattern and the respective x sensing line through the first and second contact holes in each touch block, respectively.

12. The method according to claim 11, wherein each touch block includes a first region and a third region that are connected to neighboring touch blocks along an extension direction of the gate lines through respective x sensing lines, and a second region that is connected to neighboring touch blocks along an extension direction of the data lines through respective y sensing lines, wherein the common electrode of each touch block is formed separately in each of the first to third regions.

13. The method according to claim 12, wherein each x sensing line in each touch block is separated between the respective first and second regions and between the respective second and third regions, wherein parts of each x sensing line corresponding to the respective first and third regions are connected through the respective second auxiliary line, and wherein one end of the parts of each x sensing line corresponding to the respective first and third regions is connected to the respective first connection pattern that connects the respective first and second auxiliary lines.

14. The method according to claim 13, wherein touch blocks along the extension direction of the gate lines are electrically connected through respective x sensing lines, and wherein touch blocks along the extension direction of the data lines are electrically connected through respective y sensing lines.

15. The method according to claim 14, further comprising:
    connecting an x sensing circuit to one end of the x sensing lines; and
    connecting a y sensing circuit to one end of the y sensing lines.

16. The method according to claim 15, further comprising forming a third passivation layer between the first passivation layer and the thin film transistor that is made of an inorganic insulating material, wherein the first passivation layer is made of an inorganic insulating layer and has a substantially even surface.

17. The method according to claim 11, wherein each first auxiliary line includes an extension portion protruding into a respective pixel region, and wherein the first insulating layer includes a third contact hole in each touch block, through which the respective extension portion contacts the respective first connection pattern.

18. The method according to claim 11, wherein forming each thin film transistor includes:
    forming an intrinsic amorphous silicon layer on the first insulating layer;
    crystallizing the intrinsic amorphous silicon layer into a polycrystalline silicon layer;
    patterning the polycrystalline silicon layer into a semiconductor layer including a first semiconductor region and second semiconductor regions at both sides of the first semiconductor region;
    forming a gate insulating layer on the semiconductor layer;
    forming a gate electrode on the gate insulating layer, connected to the gate line, and corresponding to the first semiconductor region;
    doping the second semiconductor regions with ions using the gate electrode as a doping mask;
    forming an insulating interlayer on the semiconductor layer and including semiconductor contact holes exposing the doped second semiconductor regions of the semiconductor layer; and
    forming a source electrode and the drain electrode on the insulating interlayer and contacting the doped second semiconductor regions through the semiconductor contact holes.

19. The method according to claim 18, wherein the insulating interlayer includes a third and a fourth contact hole in each touch block to expose the respective first and second auxiliary lines in each touch block, respectively, through which the respective first connection pattern contacts the respective first and second auxiliary lines in each touch block, respectively.

20. The method according to claim 11, wherein the common electrode in each touch block includes holes corresponding to the respective drain contact hole and the respective first contact hole, and wherein the holes of the common electrodes have areas in plan view greater than the corresponding drain electrode and the corresponding first contact hole, respectively.

* * * * *